US012756682B2

(12) United States Patent
Woodworth et al.

(10) Patent No.: US 12,756,682 B2
(45) Date of Patent: Oct. 6, 2026

(54) SYSTEMS AND METHODS FOR PUBLISHING AND USING IMAGES OF DNS ZONE CONFIGURATIONS

(71) Applicant: CenturyLink Intellectual Property LLC, Denver, CO (US)

(72) Inventors: John R.B. Woodworth, Amissville, VA (US); Dean Ballew, Sterling, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 54 days.

(21) Appl. No.: 18/971,898

(22) Filed: Dec. 6, 2024

(65) Prior Publication Data

US 2025/0193149 A1 Jun. 12, 2025

Related U.S. Application Data

(60) Provisional application No. 63/609,101, filed on Dec. 12, 2023.

(51) Int. Cl.
*H04L 61/4511* (2022.01)
*H04L 9/08* (2006.01)

(52) U.S. Cl.
CPC ........ *H04L 61/4511* (2022.05); *H04L 9/0825* (2013.01)

(58) Field of Classification Search
CPC ........................... H04L 61/4511; H04L 9/0825
USPC .......................................................... 709/245
See application file for complete search history.

(56) References Cited

U.S. PATENT DOCUMENTS 8,972,580 B2 * 3/2015 Fleischman ............. H04L 69/40 709/217
11,394,540 B1 * 7/2022 Larrew ............... H04L 61/4511
12,015,721 B1 * 6/2024 Kumar .................. H04L 9/3263
2009/0161666 A1 * 6/2009 Ku ...................... H04L 61/4557 370/352
2013/0304887 A1 * 11/2013 Cherian .................. H04W 8/26 709/223
2015/0081926 A1 * 3/2015 White ................. H04L 61/5007 709/245
2017/0041321 A1 * 2/2017 Tan ..................... H04L 61/4552
(Continued)

OTHER PUBLICATIONS

Woodworth et al., Bulk DNS Resource Records, pp. 1-28 (Jun. 2015) (Year: 2015).*
(Continued)

*Primary Examiner* — David P Zarka

(57) ABSTRACT

Systems and methods for publishing and using images of domain name system (DNS) zone configurations are described. An image file containing a copy of some or all of the DNS records associated with a zone DNS server (e.g., a DNS server for a zone) may be stored in a repository. In response to detecting that the zone DNS server is unavailable, an image server system retrieves the image file and stores the image file in an image DNS server. The image server system notifies a higher-level DNS server that the image DNS server is a DNS server for the zone. In some examples, the image file includes a zone signing key (ZSK) associated with the image DNS server that is signed by a key signing key (KSK) associated with the zone DNS server. The image DNS server uses the signed ZSK to sign DNS records for subsequent authentication.

18 Claims, 6 Drawing Sheets

(56) References Cited

U.S. PATENT DOCUMENTS

| | | | | |
|---|---|---|---|---|
| 2019/0394217 | A1* | 12/2019 | Chen | H04L 63/1425 |
| 2020/0259859 | A1* | 8/2020 | Shieh | H04L 61/4511 |
| 2021/0194867 | A1* | 6/2021 | Yasaki | H04L 63/0236 |
| 2021/0218851 | A1* | 7/2021 | Fyan | H04L 43/0817 |
| 2021/0243038 | A1* | 8/2021 | Wilson | G01S 19/14 |
| 2023/0362132 | A1* | 11/2023 | Mitchell | H04L 63/0263 |
| 2024/0205128 | A1* | 6/2024 | Floyd, III | H04L 43/0817 |
| 2024/0259425 | A1* | 8/2024 | Sani | G06F 21/554 |
| 2025/0088531 | A1* | 3/2025 | St. Pierre | H04L 63/1458 |

OTHER PUBLICATIONS

Kolkman, O. et al., "DNSSEC Opeational Practices, Version 2", *Internet Engineering Task Force* (*IETF*) rfc 6781, XP015086516 Dec. 2012 , pp. 1-71.

International Search Report and Written Opinion of the International Searching Authority, dated Mar. 1, 2025, Int'l Appl. No. PCT/US2024/058885, Int'l Filing Date Dec. 6, 2024; 9 pgs.

* cited by examiner

SYSTEMS AND METHODS FOR PUBLISHING AND USING IMAGES OF DNS ZONE CONFIGURATIONS

CROSS-REFERENCE TO RELATED APPLICATIONS

This application claims the benefit of U.S. Provisional Application No. 63/609,101 filed Dec. 12, 2023, entitled "Systems and Methods for Publishing and Using Images of DNS Zone Configurations," which is incorporated herein by reference in its entirety.

BACKGROUND

Web domains are typically accessed via a domain name system (DNS). For example, a user enters a domain name of a website into a web browser, and the DNS maps the domain name to an internet protocol (IP) address at which the website is located using information stored at one or more DNS servers. In some cases, however, a DNS server becomes unavailable or is slow to respond. It is with respect to this general technical environment that aspects of the present disclosure are directed.

SUMMARY

The present application describes a method comprising: detecting, by an image server system, that a zone domain name system (DNS) server associated with a zone is unavailable; and in response to detecting that the zone DNS server is unavailable: retrieving, from a repository, an image file comprising a set of DNS records associated with the zone DNS server, storing the image file on an image DNS server of the image server system, and transmitting, to a higher-level DNS server, an indication that the image DNS server is a DNS server for the zone.

In some examples, and in combination with any of the above aspects and examples, the method further includes receiving, at the image server system from a DNS resolver, an indication of a requested domain name in the zone; and in response to receiving the indication of the requested domain name: identifying, in the image file stored on the image DNS server, an IP address based on the requested domain name, and transmitting, to the DNS resolver, the IP address.

In some examples, and in combination with any of the above aspects and examples, the set of DNS records map domain names of the zone to corresponding IP addresses.

In some examples, and in combination with any of the above aspects and examples, one or more DNS records of the set of DNS records has been cryptographically signed for subsequent authentication.

In some examples, and in combination with any of the above aspects and examples, the image file comprises a signed zone-signing key (ZSK) associated with the image DNS server, wherein the signed ZSK is cryptographically signed by a key-signing key (KSK) associated with the zone DNS server, and the method further includes: determining, by the image server system, that a first DNS record of the set of DNS records needs to be cryptographically signed; and in response to the determination that the first DNS record needs to be signed, cryptographically signing the first DNS record with the signed ZSK.

In some examples, and in combination with any of the above aspects and examples, determining that the first DNS record needs to be cryptographically signed includes receiving, from a DNS resolver, a request for the first DNS record, and the method further includes: transmitting the cryptographically signed first DNS record to the DNS resolver.

In some examples, and in combination with any of the above aspects and examples, determining that the first DNS record needs to be cryptographically signed includes determining that an IP address associated with the first DNS record has changed from a first IP address to a second IP address; and in response to the determination that the IP address has changed: updating the IP address of the first DNS record from the first IP address to the second IP address to generate an updated first DNS record.

In some examples, and in combination with any of the above aspects and examples, the image file comprises an indication of allowable transfers from other zones.

In some examples, and in combination with any of the above aspects and examples, the method further includes transmitting, to the higher-level DNS server, expiration information associated with the indication that the image DNS server is the DNS server for the zone.

In some examples, and in combination with any of the above aspects and examples, detecting that the zone DNS server is unavailable includes determining, by the image server system, that a response time of the zone DNS server exceeds a threshold latency.

In some examples, and in combination with any of the above aspects and examples, detecting that the zone DNS server is unavailable includes receiving a notification from an external computing device.

In some examples, and in combination with any of the above aspects and examples, the set of DNS records includes a start of authority (SOA) record.

In some examples, and in combination with any of the above aspects and examples, the higher-level DNS server is a top-level domain (TLD) DNS server or a root DNS server.

In another aspect, the present technology includes a system that includes at least one processor; and memory, storing instructions that, when executed by the at least one processor, cause the system to perform a method, the method comprising: detecting that a zone domain name system (DNS) server associated with a zone is unavailable; and in response to detecting that the zone DNS server is unavailable: retrieving, from a repository, an image file comprising a set of DNS records associated with the zone DNS server, storing the image file on an image DNS server of the system, and transmitting, to a higher-level DNS server, an indication that the image DNS server is a DNS server for the zone.

In some examples, and in combination with any of the above aspects and examples, the method further includes: receiving, from a DNS resolver, an indication of a requested domain name in the zone; and in response to receiving the indication of the requested domain name: identifying, in the image file on the image DNS server, an IP address based on the requested domain name, and transmitting, to the DNS resolver, the IP address.

In some examples, and in combination with any of the above aspects and examples, the set of DNS records map domain names of the zone to corresponding IP addresses.

In some examples, and in combination with any of the above aspects and examples, one or more DNS records of the set of DNS records has been cryptographically signed for authenticating the respective DNS record.

In some examples, and in combination with any of the above aspects and examples, the image file comprises a signed zone-signing key (ZSK) associated with the image DNS server, wherein the signed ZSK is cryptographically signed by a key-signing key (KSK) associated with the zone DNS server, and the method further includes: determining that a first DNS record of the set of DNS records needs to be cryptographically signed; and in response to the determination that the first DNS record needs to be cryptographically signed, cryptographically signing the first DNS record with the signed ZSK.

In some examples, and in combination with any of the above aspects and examples, determining that the first DNS record needs to be cryptographically signed includes receiving, from a DNS resolver, a request for the first DNS record, and the method further includes transmitting the cryptographically signed first DNS record to the DNS resolver.

In another aspect, the present technology includes a method performed at an image server system, the method including: detecting that a zone domain name system (DNS) server associated with a zone is unavailable; and in response to detecting that the zone DNS server is unavailable: retrieving, from a repository, an image file comprising a set of DNS records associated with the zone DNS server, retrieving a signed zone-signing key (ZSK) associated with an image DNS server of the image server system, wherein the signed ZSK is cryptographically signed by a key-signing key (KSK) associated with the zone DNS server, storing the image file and the signed ZSK on the image DNS server, and transmitting, to a higher-level DNS server, an indication that the image DNS server is a DNS server for the zone; after storing the image file and the signed ZSK on the image DNS server, determining that a first DNS record of the set of DNS records needs to be cryptographically signed; in response to the determination that the first DNS record needs to be cryptographically signed, cryptographically signing the first DNS record with the signed ZSK; and transmitting the cryptographically signed first DNS record to a DNS resolver.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
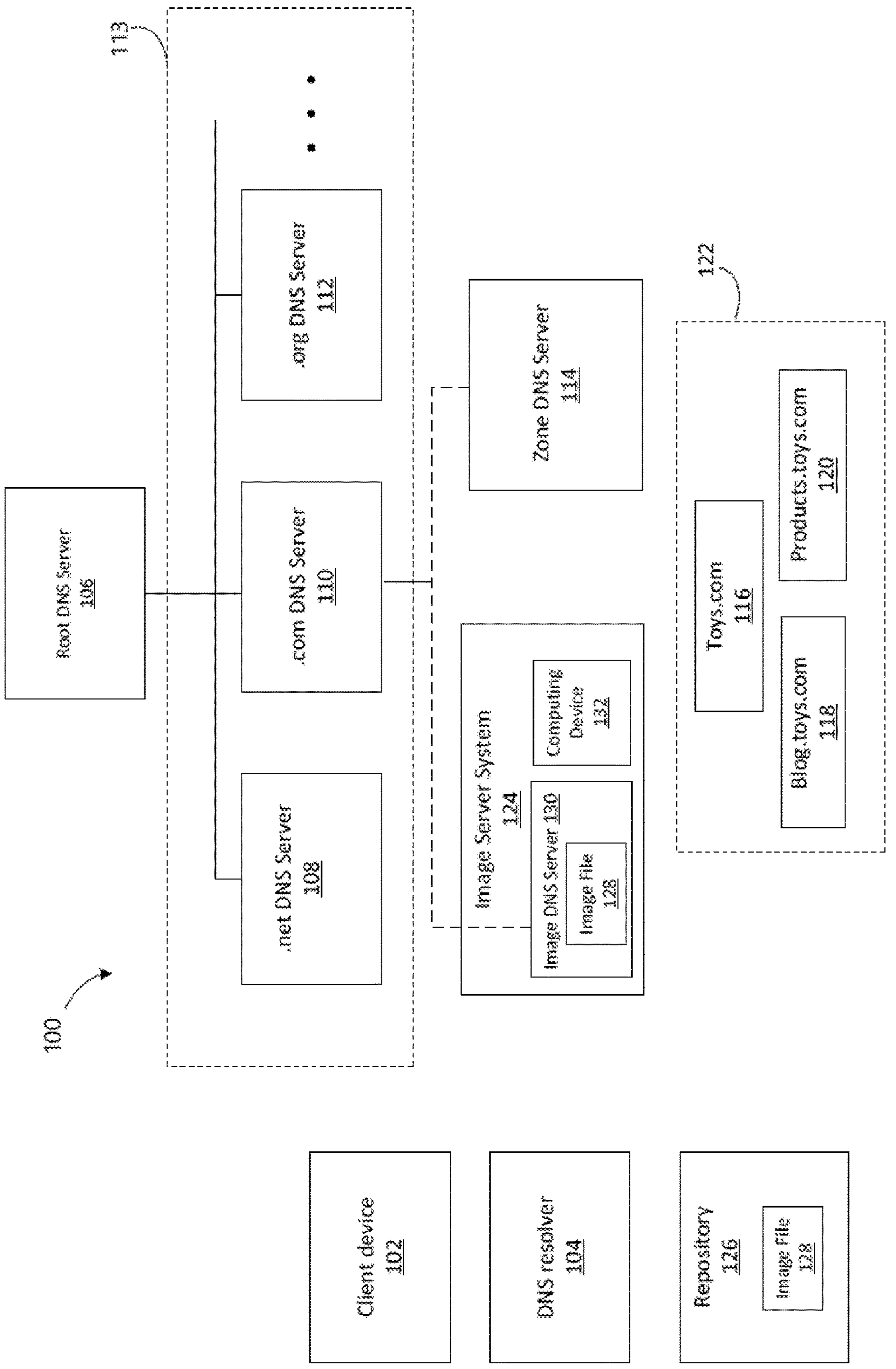
FIG. 1 is a block diagram depicting an example system according to aspects of the present application.

Web domains (e.g., websites) are typically accessed via a domain name system (DNS) that includes a hierarchy of DNS servers. A user enters a domain name of a website into a web browser, and the DNS uses the DNS servers to map the domain name to an internet protocol (IP) address at which a server hosting the website is located. The DNS lookup process may involve a DNS resolver querying a hierarchy of DNS servers to reach a target server (e.g., the server that is hosting the requested domain). For example, a DNS resolver receives the domain name via the user's browser and queries a root (highest-level) DNS server, which responds with an IP address of a top-level domain (TLD) DNS server (such as .com, .net, or another TLD server). In some examples, the DNS resolver may have already cached the IP address of a TLD server. The DNS resolver queries the TLD server (e.g., using the TLD server's IP address), and the TLD server may respond with the IP address of a lower-level zone DNS server, which may respond with the IP address for the requested website. For example, if the client browser asked the DNS resolver to resolve mail.example.com, the DNS resolver may make successive queries to the root DNS server, the .com TLD DSN server, and the example.com zone DNS server, before finally receiving an IP address for the mail.example.com website. This IP address can then be used to access the domain. In some examples, additional levels of DNS hierarchy may also be traversed in order to reach a final IP address of the requested website.

A DNS server for a domain within the DNS hierarchy may become unavailable due to hardware or software errors or due to excessive demand. For example, a domain may be the target of a denial-of-service attack that overloads the domain's DNS server and causes the domain's DNS server to be unable to efficiently respond to legitimate queries. To mitigate the risk of the domain becoming unavailable, some owners of DNS servers maintain multiple copies of the DNS records on multiple servers to provide redundancy in case of a denial-of-service attack or other access problems. Such an approach, however, may incur significant additional costs to maintain redundant DNS servers that may be needed infrequently—or may never be needed at all.

As described herein, an owner of a DNS zone (e.g., a domain and its sub-domains that are accessed via the same DNS server) may store an image (e.g., a copy) of the DNS records for the corresponding DNS server in an external repository, such as GitHub or another type of repository. The image may be periodically updated to reflect changes to the DNS records on the primary DNS server and maintain an accurate backup file. When an outage of the primary DNS server for the zone is detected (e.g., either the DNS server fails to respond to one or more DNS query or responds with excessive latency), another entity, such as an Internet service provider (ISP), can retrieve the image from the external repository and "stand up" (e.g., publish) the image, thereby providing an on-demand backup DNS server for the zone. An advantage of this approach is that the domain owner may only incur additional costs when the backup DNS server is needed rather than paying for a redundant server all the time.

The domain owner (e.g., a computing system or server associated with the domain owner) may perform various setup tasks to prepare for the possibility of transferring the DNS server capability to the backup DNS server. For example, the domain owner may provide the administrator of the backup DNS server (e.g., the ISP) the location of the image file in the repository to enable the backup DNS server to retrieve the image file when needed. The domain owner may notify a higher-level DNS server, such as a TLD server, that the backup DNS server is authorized to become a DNS server for the zone. The higher-level DNS server may publish the public ZSK to enable verification of the backup DNS server by the DNS resolver.

In some examples, the primary DNS server for the zone is configured to implement security measures to thwart unauthorized attempts to intercept and/or change DNS records. For example, the DNS server may be configured to support DNS security extensions (DNSSEC) that are used (e.g., by a DNS resolver or another entity) to authenticate DNS records using a public key/private key system. In DNSSEC, DNS records are signed by the DNS server using a private key and authenticated using a public key. In some cases, some or all of the DNS records are signed for DNSSEC offline (e.g., by the zone DNS server). In this case, the signed DNS records may be stored in the image file, and the backup DNS server may not need to sign the DNS records.

In some cases, however, the zone DNS server is configured to sign one or more DNS records for DNSSEC in real-time (online), such as when the DNS server updates an IP address in a DNS record or when the DNS record is accessed based on a requested domain name. If the zone DNS server is configured to support online DNSSEC signing, the backup DNS server may also be configured to support online signing of DNS records using a double key approach in which a private zone signing key (ZSK) associated with the backup DNS server is cryptographically signed by a private key signing key (KSK) associated with the primary DNS server. The backup DNS server can then use the signed ZSK to sign DNS records on behalf of the domain owner, as discussed in more detail herein. The ZSK associated with the backup DNS server may be signed by the KSK associated with the primary DNS server in advance (e.g., before the backup DNS server is needed) and made available to the backup DNS server (e.g., by including the signed ZSK in the image file or in another file in the repository). In examples, this approach avoids the need for the private ZSK of the zone DNS server to be stored in the image file, where it would potentially be vulnerable to theft or misuse.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. In addition, all systems described with respect to the figures can comprise one or more machines or devices that are operatively connected to cooperate in order to provide the described system functionality. Moreover, references to "a server" should be understood to include one or more servers. The following detailed description is therefore not to be taken in a limiting sense, and the scope of the present disclosure is defined by the appended claims and their equivalents.

FIG. 1 discloses an example system 100 according to aspects of the present disclosure. System 100 depicts a DNS server hierarchy that can be used to access a website based on a domain name entered by a user of a client device 102 (e.g., in a browser). The example of FIG. 1 depicts a DNS hierarchy that includes a zone DNS server 114 associated with the domain "toys.com" and its sub-domains "blog.toys.com" and "products.toys.com." A domain and its sub-domains that are served by the same DNS server may be referred to as a DNS zone. In this example, TLD DNS server 110 is a higher-level server of zone DNS server 114, and root DNS server 106 is a higher-level server for TLD DNS server 110 and zone DNS server 114. Although only three levels of a DNS hierarchy are shown (root DNS server 106, TLD DNS servers 113, and zone DNS server 114), it will be appreciated that more or fewer DNS hierarchy levels are possible and contemplated.

Client device 102 is a computing device such as a laptop, desktop computer, cellular phone, tablet, or another type of computing device. Client device 102 may receive a user input specifying a requested domain name; e.g., a website that a user of client device 102 wishes to access. In response to receiving the input, client device 102 may transmit the requested domain name to a DNS resolver 104, which is responsible for determining the IP address associated with the requested domain name. In some examples, if the DNS resolver 104 does not already have cached an IP address for one or more of the DNS servers responsible for the requested domain, the DNS resolver 104 begins the determination of the IP address by querying a root DNS server 106. The root DNS server 106 maps a requested domain name to an IP address of one of a group of top-level domain (TLD) DNS servers 113 (e.g., including TLD DNS servers 108, 110, and 112). For example, the root DNS server 106 selects one of the TLD DNS servers 108, 110, or 112 based on a first (e.g., right-most) portion of the domain name, such as based on a top-level domain (e.g., .com, .net, .org, etc.), and returns the IP address of the selected TLD DNS server to the DNS resolver 104. The DNS resolver 104 then queries the selected TLD DNS server 108, 110, or 112, which maps the requested domain name to a zone DNS server 114 based on a second portion of the domain name, such as a second-level domain. For example, in FIG. 1, the zone DNS server 114 is a DNS server for a DNS zone 122 that includes the toys.com domain 116 (having domain name toys.com) where ".com" is the top-level domain and "toys" is the second-level domain. DNS zone 122 also includes the blog.toys.com sub-domain 118 and the products.toys.com sub-domain 120.

The zone DNS server 114 includes (e.g., stores, hosts) multiple DNS records that map domain names of domains and sub-domains in the DNS zone 122 to IP addresses of servers that host the domain and sub-domains associated with (e.g., accessed via) the zone DNS server 114. Zone DNS server 114 may be managed by an owner of the domain, for example.

System 100 includes a repository 126. The repository 126 may be a repository (such as a GitHub repository or another type of repository) that is stored on a server or other storage device and stores an image file 128 containing a copy of some or all of the DNS records stored in the zone DNS server 114. For example, an owner or manager of the zone DNS server 114 may maintain a backup copy of some or all of the DNS records stored on the zone DNS server 114 as an image file 128 in the repository 126. Similarly, in some examples, the TLD DNS servers 113 may also maintain a backup copy of some or all of the DNS records stored on one or more the TLD DNS servers 113 as images in repository 126. In examples, the backup copies are updated periodically and with enough frequency to be reasonably accurate should they be needed.

In some examples, the image file 128 includes a start of authority (SOA) record associated with the zone that includes information about the zone, such as an email address of the zone administrator, a date and/or time at which the zone was last updated, or other information about the zone. In some examples, the image file 128 includes one or more address records (A records) and/or AAAA records. Each of the A records and AAAA records include a domain name and an IP address associated with the domain name. In some examples, the image file 128 also includes one or more nameserver (NS) records, each of which specifies a domain and an IP address of an authoritative DNS server for the domain. In some examples, the DNS records include a cryptographic signature that can be used to authenticate the DNS records using DNSSEC. For example, the DNS records may be signed offline using a key signing key (KSK) associated with the zone DNS server 114.

In some examples, the image file 128 includes an indication of allowable transfers from other zones (e.g., information regarding allowable zone transfers). For example, the image file 128 may include an indication of other nameservers that are allowed to transfer IP addresses to the zone DNS server (and therefore, to the image DNS server 130 described below).

System 100 includes an image server system 124 that includes an image DNS server 130 that may be used as a backup DNS server for zone DNS server 114 (or one of the TLD DNS servers 113) in the event that zone DNS server 114 (or one of the TLD DNS servers 113) becomes unavailable. For purposes of illustration, examples are described going forward where the image DNS server 130 is used as a backup DNS server for zone DNS server 114. The image server system 124 may be managed by a different entity than the entity that owns and/or manages the zone DNS server 114, such as an Internet service provider (ISP). The image server system 124 includes a computing device 132 that may be configured to detect that the zone DNS server 114 is unavailable based on, for example, determining that a response time (or a threshold number (or average) of recent response times) of the zone DNS server 114 exceeds a threshold latency and/or based on receiving another indication that the zone DNS server 114 is unavailable (such as receiving a notification from an external computing device indicating that the zone DNS server 114 is unavailable).

The image server system 124 may be configured to retrieve the image file 128 from the repository 126 and store the image file 128 in the image DNS server 130 (e.g., using the computing device 132) in response to detecting that the zone DNS server 114 is unavailable. In this case, the image server system 124 may also notify the appropriate TLD DNS server (e.g., TLD DNS server 110 associated with zone 122) that the image DNS server 130 is now acting as a DNS server (e.g., an authoritative DNS server, a DNS nameserver) for the zone 122 so that the TLD DNS server 110 directs queries associated with the domains and sub-domains in the zone 122 to the IP address of the image DNS server 130. For example, the image DNS server 130 may transmit an indication to the TLD DNS server 110 that the image DNS server 130 is a DNS server for the zone 122. In some examples, the zone DNS server 114 may transmit, to the TLD DNS server 110, an indication that the image DNS server 130 is authorized to become a DNS server for the zone 122. The zone DNS server 114 may transmit this indication to the TLD DNS server 110 before the image DNS server 130 transmits the indication that the image DNS server 130 is a DNS server for the zone 122; e.g., in preparation for the possibility that the image DNS server 130 may become a DNS server for the zone.

The image DNS server 130 can then function as a zone DNS server for the zone 122 (e.g., instead of or in addition to the zone DNS server 114). For example, the image server system 124 can receive an indication of a requested domain name in the zone (e.g., from DNS resolver 104 or from a TLD DNS server 110) and in response, provide a corresponding IP address at which the domain is hosted.

In some examples, the image server system 124 is configured to support DNSSEC with online signing to enable the image server system 124 to update IP addresses in the image DNS server 130 and cryptographically sign the DNS records online as needed. The image server system 124 may sign DNS records using a private zone signing key (ZSK) associated with the image DNS server 130. In examples, the ZSK of the image DNS server 130 has been signed by a private key signing key (KSK) associated with the zone DNS server 114 to generate a signed ZSK. The signed ZSK can then be used by the DNS resolver 104 to authenticate the DNS record based on a public key associated with the KSK of the zone DNS server 114 and a public key associated with the ZSK of the image DNS server 130. In some examples, the signed ZSK associated with the image DNS server 130 is stored in the image file 128 in the repository 126. The signed ZSK may be generated and stored in advance, to prepare for the possibility that the image DNS server 130 will become a DNS server for the zone and will need to be able to sign DNS records. In some examples, the signed ZSK associated with the image DNS server 130 is stored in the image server system 124.

In some examples, a public ZSK of the image DNS server 130 (e.g., a public ZSK of the image DNS server 130 that is provided to a higher-level DNS server) includes a revocation URL that can be used to determine when the image DNS server 130 will cease to be a DNS server for the zone.

In some examples, an administrator of the zone decides to discontinue the use of the image DNS server 130 (e.g., if the zone administrator wants to withdraw from the backup service or migrate the image DNS server 130 to another server). In this case, the zone administrator (or another entity, such as the ISP) may update a registrar (e.g., the set of DNS records) for the TLD server for the zone by removing the NS record associated with the zone or replacing the NS record with another NS record that points to the IP address of the new server (e.g., the original zone DNS server 114 or another server). The new NS record would be propagated to the zone and run on the authoritative nameserver for the zone to enable the DNS resolver to identify the location of the new server.

In some examples, changes made to DNS records on the image DNS server 130 are propagated back to the zone, such as via allowing dynamic DNS or via a setting on the nameserver for the zone. In some examples, the changes are provided to a DNS management system that manages the zone residing on the nameserver. The DNS management system may deploy the new version of the zone (with the new records from the image DNS server 130) to the authoritative nameserver for the zone. The DNS management system may poll the image DNS server 130 for changes and/or poll the nameserver (if dynamic DNS is allowed) for changes and incorporate the changes into a new version of the zone in a database of the DNS management system for immediate or future deployment.

Figure 2:
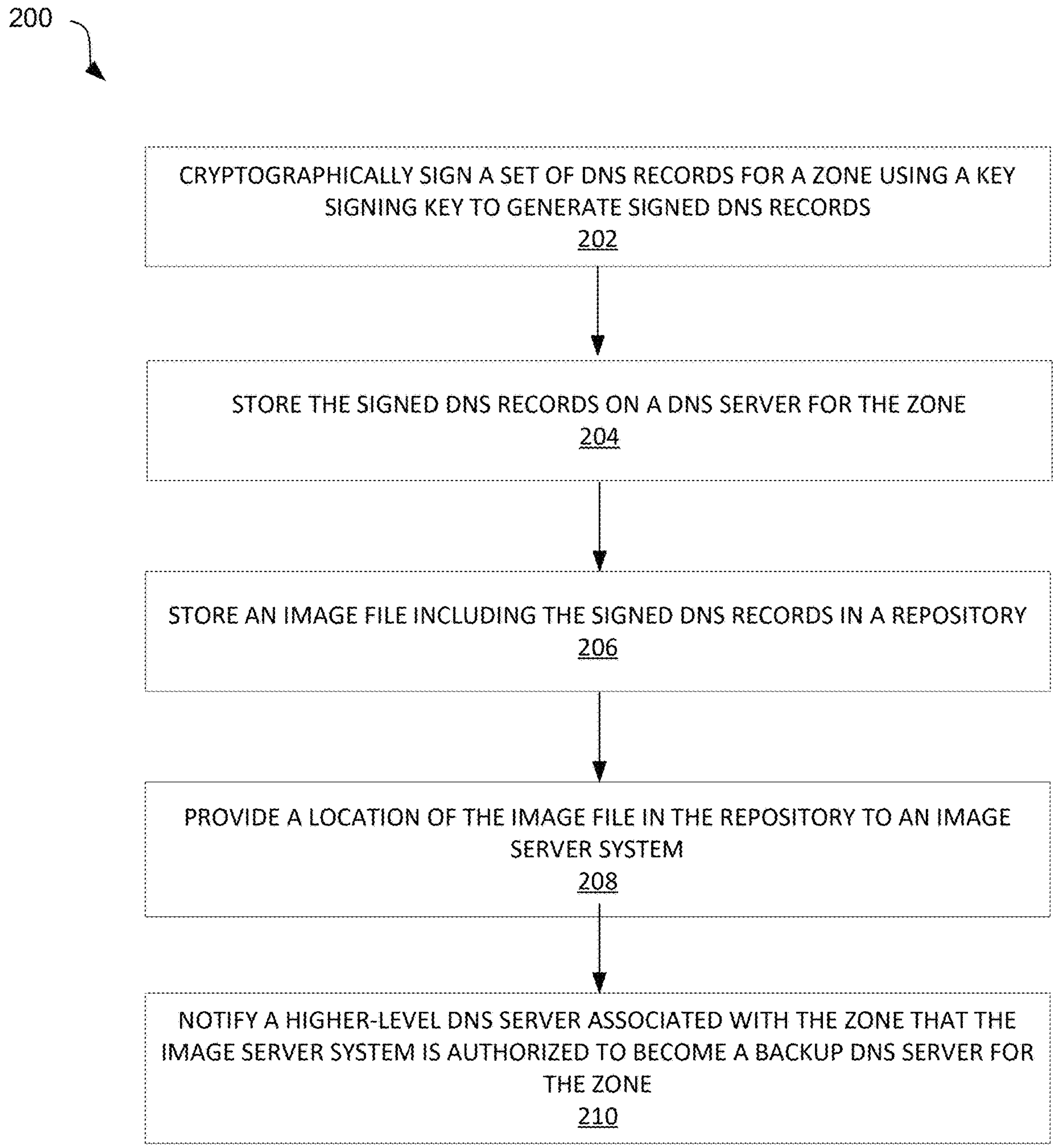
FIG. 2 is an example method for publishing and using images of DNS zone configurations according to aspects of the present application.

FIG. 2 depicts an example method 200 according to aspects of the present application. In examples, one or more of the operations of FIG. 2 can be performed by computing device, such as computing device 600 shown in FIG. 6, and/or by a zone DNS server, such as zone DNS server 114. Method 200 may represent processes performed by computing systems of an entity associated with a zone, such as the zone's owner, to enable another entity, such as an ISP, to provide a backup DNS server when the zone DNS server is unavailable. Method 200 may enable the backup DNS server to support DNSSEC with offline signing.

At operation 202, a set of DNS records for a zone (e.g., DNS zone 122) are cryptographically signed using a private KSK, such as a private KSK associated with a DNS server for the zone (e.g., zone DNS server 114). In some examples, one or more DNS records of the set of DNS records includes a domain name and a corresponding IP address.

At operation 204, the signed DNS records are stored on a DNS server for the zone (e.g., zone DNS server 114).

At operation 206, an image file (e.g., image file 128) including the signed DNS records is stored in a repository (e.g., repository 126). In some examples, the image file includes some or all of the signed DNS records. In some embodiments, the image file includes one or more A and/or AAAA records. In some examples, the image file includes an SOA record.

At operation 208, a location of the image file in the repository is provided to an image server system (e.g., image server system 124). In some examples, the location includes an IP address, domain name, and/or security information (such as a password, hash function, or other type of security information) that can be used, by the image server system, to access the image in the repository.

At operation 210, a higher-level DNS server (e.g., TLD DNS server 110 and/or root DNS server 106) associated with the zone is notified that the image server system is authorized to become a backup DNS server for the zone. In some examples, the higher-level DNS server (e.g., a TLD server) may publish the public ZSK key for the image DNS server to enable verification of the image DNS server by the DNS resolver. For example, the public key may be published via the DNSSEC protocol, such as using a DNSKEY record that contains the public ZSK key and a delegation signer (DS) record that includes a hash of the DNSKEY record.

Figure 3:
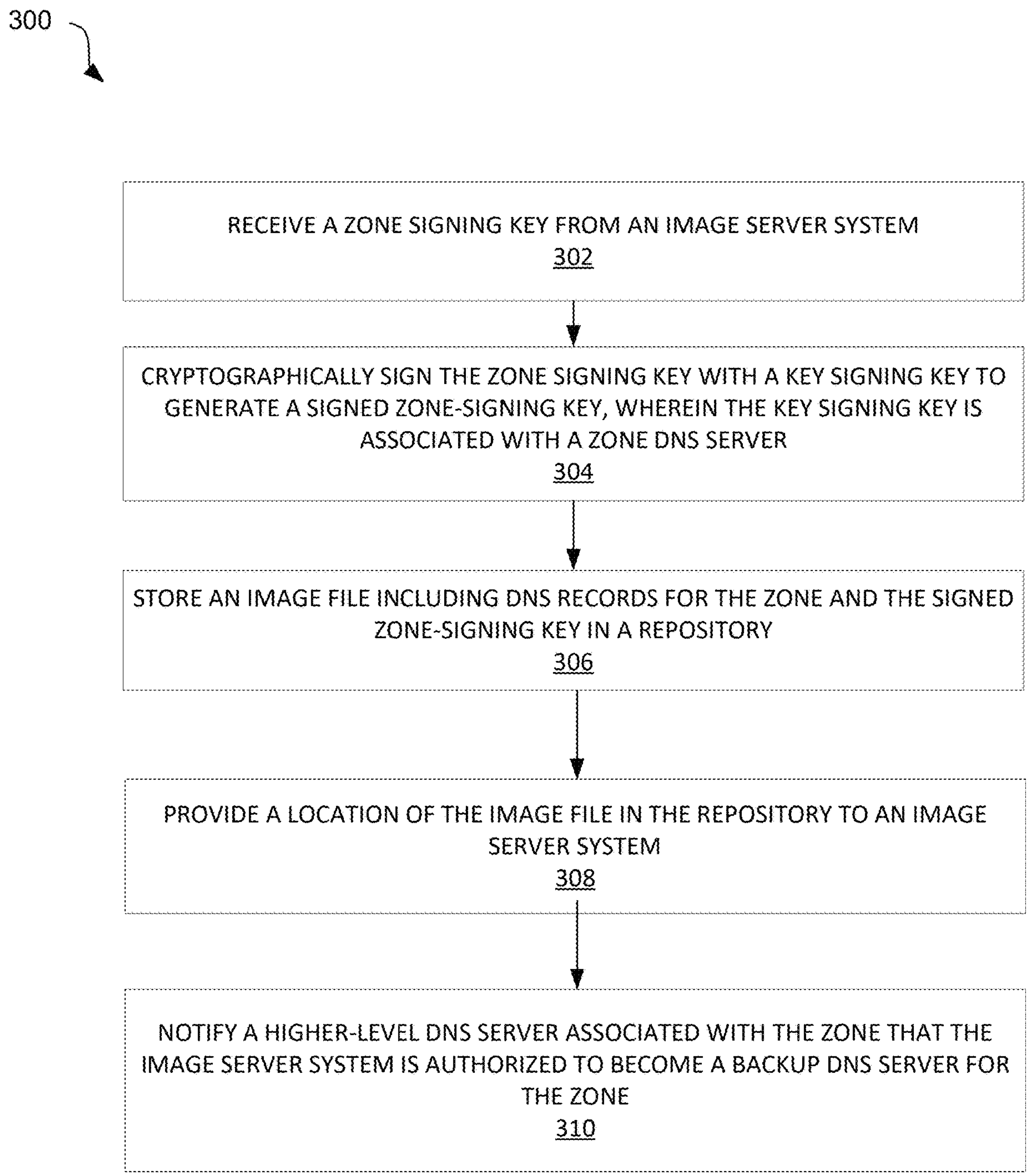
FIG. 3 is an example method for publishing and using images of DNS zone configurations according to aspects of the present application.

FIG. 3 depicts an example method 300 according to aspects of the present application. In examples, one or more of the operations of FIG. 3 can be performed by computing device, such as computing device 600 shown in FIG. 6, and/or by a zone DNS server, such as zone DNS server 114. Method 300 may represent processes performed by computing systems of an entity associated with a zone, such as the zone's owner, to enable another entity, such as an ISP, to provide a backup DNS server when the zone DNS server is unavailable. Method 300 may enable the backup DNS server to support DNSSEC with real-time (online) signing.

At operation 302, a ZSK is received from an image server system (e.g., image server system 124). For example, image server system 124 may transmit a private ZSK associated with image DNS server 130 to zone DNS server 114 or to a computing device associated with zone DNS server 114.

At operation 304, the ZSK is signed with a KSK to generate a signed ZSK, where the KSK is associated with a zone DNS server (e.g., zone DNS server 114). For example, the KSK may be a private KSK that is used by zone DNS server 114 to cryptographically sign DNS records stored in zone DNS server 114.

At operation 306, an image file including DNS records for the zone and, in some examples, the signed ZSK is stored in a repository (e.g., in an image file 128 is stored in repository 126). In some examples, the image file includes some or all of the DNS records for the zone. In some embodiments, the image file includes an SOA record and one or more A and/or AAAA records. In some examples, the signed ZSK is stored in a separate file in the respository.

At operation 308, a location of the image file in the repository is provided to an image server system (e.g., image server system 124). In some examples, the location includes an IP address, domain name, and/or security information (such as a password, hash function, or other type of security information) that can be used, by the image server system, to access the image in the repository.

At operation 310, a higher-level DNS server (e.g., TLD DNS server 110 and/or root DNS server 106) associated with the zone is notified that the image server system is authorized to become a backup DNS server for the zone.

Figure 4:
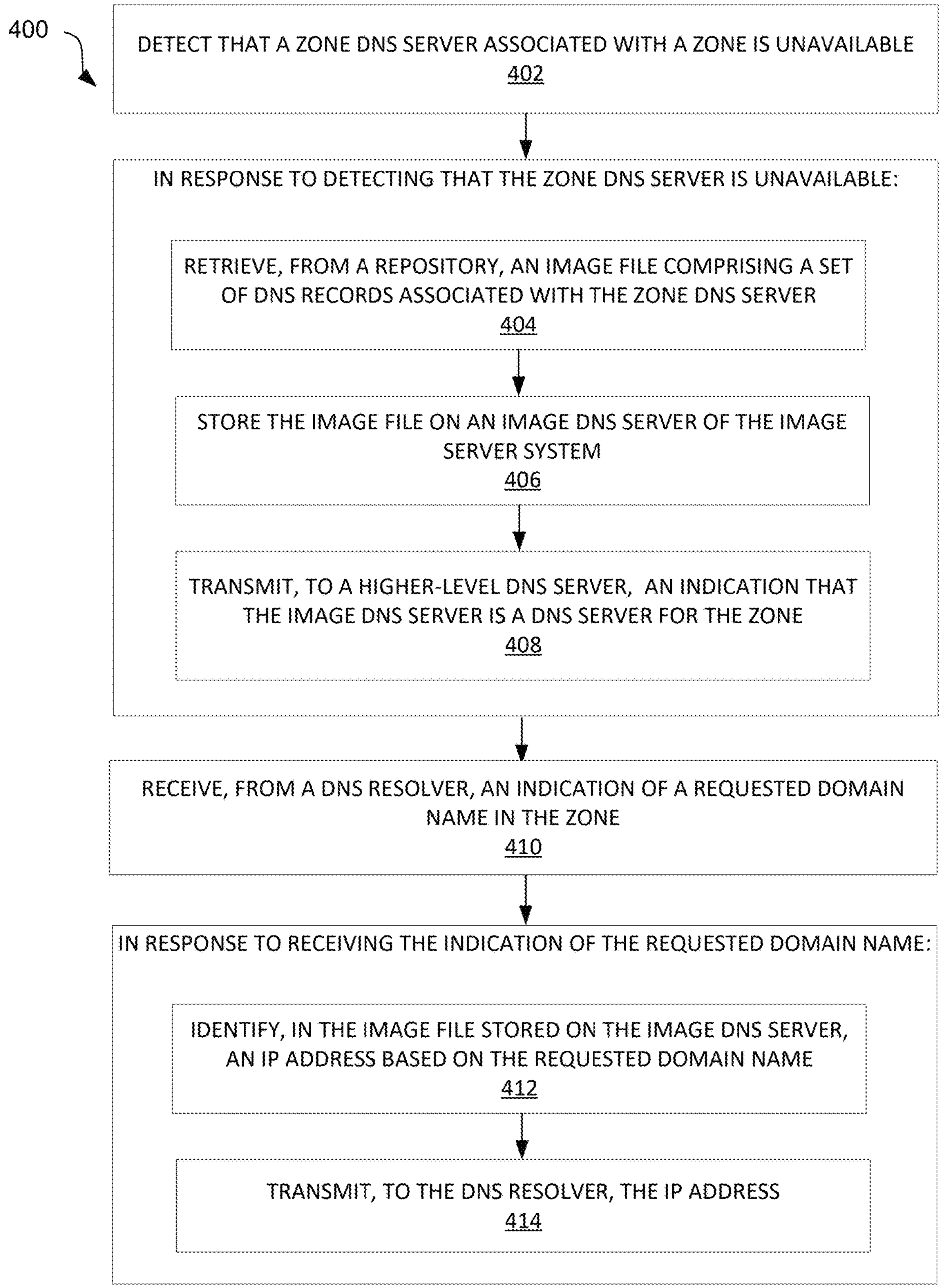
FIG. 4 is an example method for publishing and using images of DNS zone configurations according to aspects of the present application.

FIG. 4 depicts an example method 400 according to aspects of the present application. In examples, one or more of the operations of FIG. 4 can be performed by an image server system, such as image server system 124. Method 400 may represent processes performed by computing systems of an entity associated with providing a backup DNS server (e.g., image DNS server 130) when a zone DNS server (e.g., zone DNS server 114) is unavailable, such as an ISP.

At operation 402, an image server system (e.g., image server system 124) detects that a zone DNS server (e.g., zone DNS server 114) is unavailable. In some examples, the image server system detects that the zone DNS server is unavailable by detecting that a latency associated with communicating with the zone DNS server satisfies a threshold latency. For example, the image server system may ping the zone DNS server (or otherwise attempts to communicate with the zone DNS server) or attempt to access a domain of the zone DNS server and fail to receive a response within a threshold time duration. In some examples, the image server system detects that the zone DNS server is unavailable by receiving, from an external computing device, a notification that the zone DNS server is unavailable.

For example, a DNS resolver (such as DNS resolver 104) may determine that the zone DNS server is unavailable, unresponsive, or responding slower than expected. In examples, this may be measured by a single response (or lack of response) to a query, an average latency of response from multiple queries within a measuring period, a count of responses with a latency above a threshold within a measuring period, or otherwise. In some examples, the DNS resolver may be operated or controlled by a same party (such as an Internet service provider) that is operating the image server system, such as image server system 124. As such, the image server system may, therefore, trust a notification of a DNS resolver's determination of whether the zone DNS server is unavailable, thereby triggering the image server system to begin operating as a backup for the zone DNS server. In other examples, the determination that the zone DNS server is unavailable may be made by a higher-level DNS server, such as TLD DNS server 110, or by the zone DNS server itself, such as zone DNS server 114 (e.g., if the zone DNS server is still operating but is overloaded).

In response to detecting that the zone DNS server is unavailable, the image server system performs operations 404-408.

At operation 404, the image server system retrieves, from a repository (e.g., repository 126), an image file (e.g., image file 128) that includes a set of DNS records associated with the zone DNS server. For example, the image server system accesses a server on which the repository is stored to read the image file from the repository. In some examples, the image server system also retrieves a signed zone-signing key (ZSK) associated with an image DNS server of the image server system, wherein the signed ZSK is cryptographically signed by a key-signing key (KSK) associated with the zone DNS server. In some examples, the signed ZSK is included in the image file, and the signed ZSK is retrieved by retrieving the image file. In some examples, the signed ZSK is stored in a separate file (e.g., not in the image file), and retrieving the signed ZSK is retrieved by retrieving the separate file. In some examples, the separate file is stored in the repository.

At operation 406, the image server system stores the image file that was retrieved from the repository at operation 404 on an image DNS server (e.g., image DNS server 130). In some examples, the image server system also stores the signed ZSK on the image DNS server, either within the image file (e.g., the signed ZSK is stored as part of storing the image file) or in a separate file.

At operation 408, the image server system transmits, to a higher-level DNS server (e.g., TLD DNS server 110, root DNS server 106, or another higher-level DNS server), an indication that the image DNS server is a DNS server for the zone. For example, the image server system transmits a domain name associated with the zone, an IP address of the image DNS server, and/or other information that indicates, to the higher-level DNS server, that the image DNS server is a DNS server for the zone. In some examples, the indication that the image DNS server is a DNS server for the zone includes expiration information that indicates a date and/or time at which the image DNS server will cease to be a DNS server for the zone.

After the image server system has performed operations 404-408, the image server system (including the image DNS server) may begin to operate as the DNS server for the zone, such as described with respect to operations 410-414.

At operation 410, the image server system receives, from a DNS resolver (e.g., DNS resolver 104), an indication of a requested domain name in the zone. The requested domain name may be, for example, a domain name entered by a user in a web browser.

In response to receiving the indication of the requested domain name, the image server system performs operations 412-414.

At operation 412, the image server system identifies, in the image file stored on the image DNS server, an IP address based on the requested domain name. For example, the image server system uses the requested domain name to look up a corresponding IP address on the image DNS server.

At operation 414, the image server system transmits, to the DNS resolver, the IP address identified at operation 412.

Figure 5:
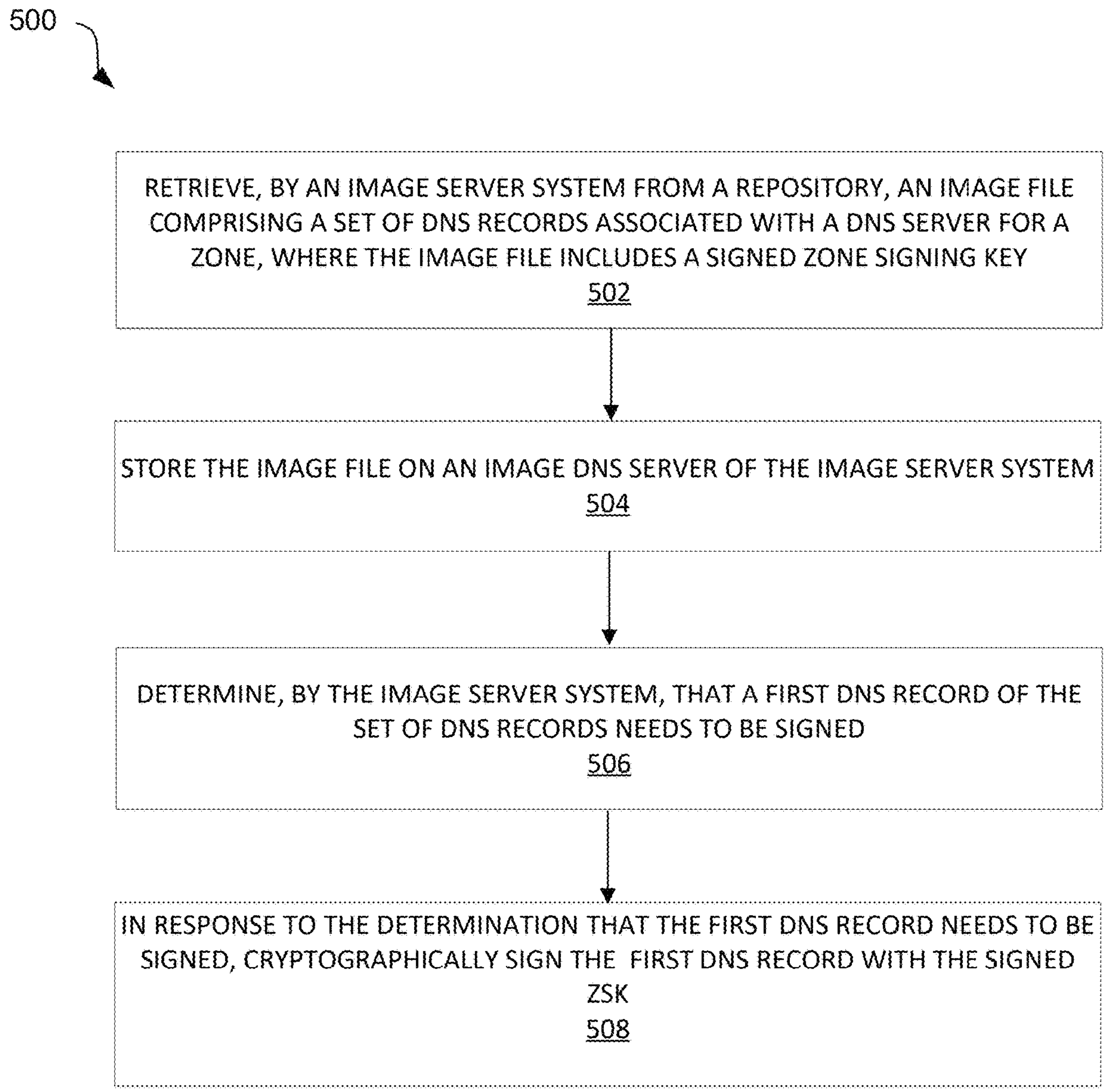
FIG. 5 is an example method for publishing and using images of DNS zone configurations according to aspects of the present application.

FIG. 5 depicts an example method 500 according to aspects of the present application. In examples, one or more of the operations of FIG. 5 can be performed by an image server system, such as image server system 124. Method 500 may represent processes performed by computing systems of an entity associated with providing a backup DNS server (e.g., image DNS server 130) when a zone DNS server (e.g., zone DNS server 114) is unavailable, such as an ISP.

At operation 502, an image server system retrieves, from a repository (e.g., repository 126) an image file (e.g., image file 128) that includes a set of DNS records associated with a zone DNS server (e.g., zone DNS server 114), where the image file includes a signed ZSK. The signed ZSK may be a private ZSK associated with the image server system that has been cryptographically signed by a private KSK associated with a zone DNS server. In some examples, the image server system retrieves the image file in response to detecting that the zone DNS server is unavailable, such as described with reference to operation 402 of method 400. In some examples, the image server system retrieves the image file in response to a different trigger.

At operation 504, the image server system stores the image file retrieved from the repository at operation 502 on an image DNS server (e.g., image DNS server 130).

At operation 506, the image server system determines that a first DNS record of the set of DNS records needs to be signed. For example, the image server system determines that a first DNS record has been requested (e.g., by a DNS resolver based on a requested domain name) and/or that an IP address associated with a first DNS record of the set of DNS records has changed from a first IP address to a second IP address. For example, the image server system may receive, from an external computing device, an indication that the IP address associated with a first DNS record has changed from the first IP address to the second IP address.

At operation 508, in response to the determination that the first DNS record needs to be signed, the image server system cryptographically signs the updated first DNS record with the signed ZSK.

Figure 6:
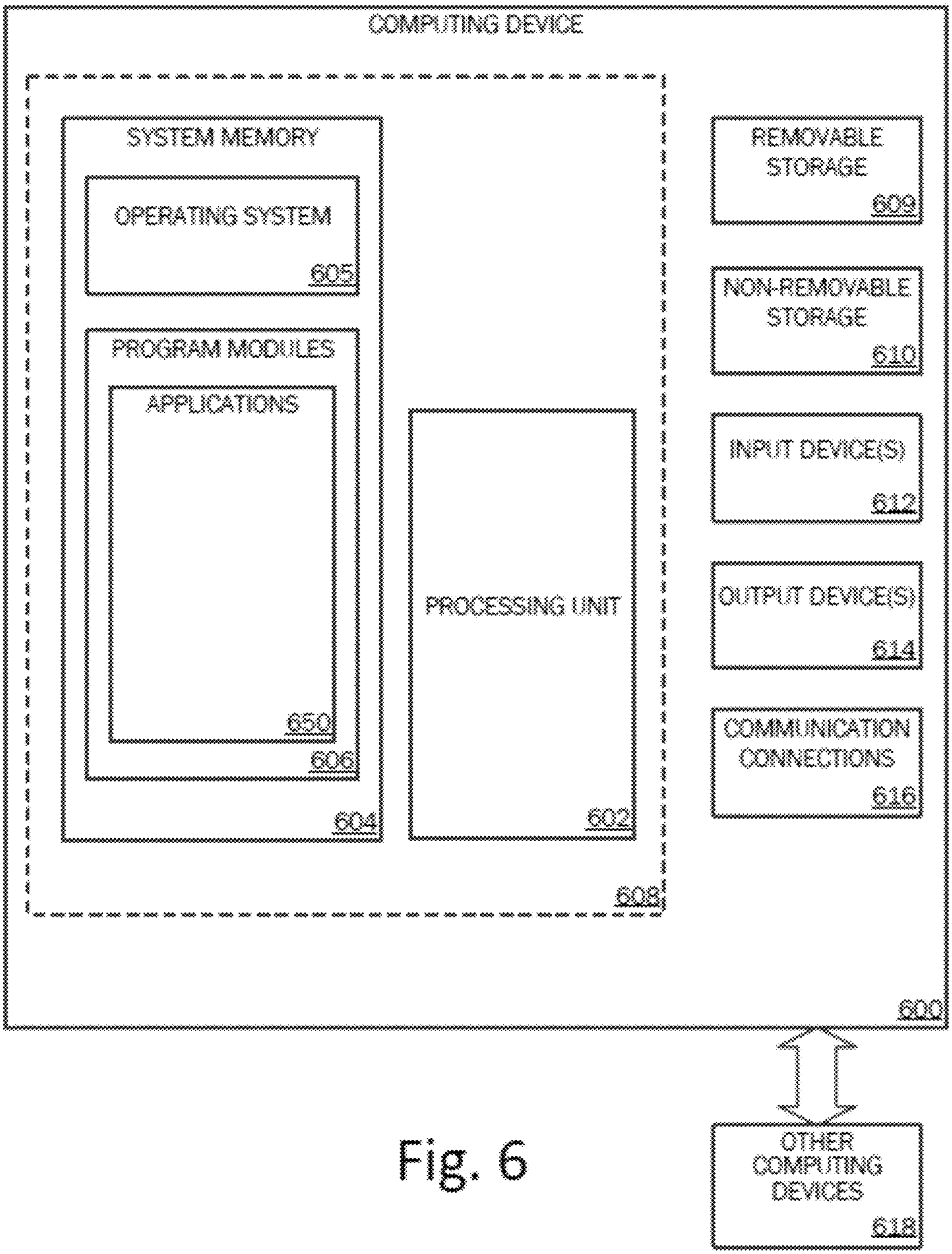
FIG. 6 is a block diagram of an example computing system that can be employed in relation to the present application.

FIG. 6 is a block diagram illustrating physical components (i.e., hardware) of a computing device 600 with which examples of the present disclosure may be practiced. The computing device components described below may be suitable for a computing device(s) implementing (or included in) the client device 102, repository 126, image server system 124, zone DNS server 114, and/or other components of FIG. 1. In a basic configuration, the computing device 600 may include at least one processing unit 602 and a system memory 604. The processing unit(s) (e.g., processors) may be referred to as a processing system. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 650 to implement one or more of the components or systems described above with respect to FIG. 1.

The operating system 605, for example, may be suitable for controlling the operation of the computing device 600. Furthermore, aspects of the invention may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610. The computing device 600 may be part of and/or connected to a server system that provides services (e.g., DNS services) over a network to one or more client devices.

As stated above, a number of program modules and data files may be stored in the system memory 604. While executing on the processing unit 602, the program modules 606 may perform processes including, but not limited to, one or more of the operations of the methods illustrated in FIGS. 2-5. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or “burned”) onto the chip substrate as a single integrated circuit. When operating via an SOC, the functionality, described herein, with respect to generating suggested queries, may be operated via application-specific logic integrated with other components of the computing device 600 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 600 may also have one or more input device(s) 612 such as a keyboard, a mouse, a pen, a sound input device, a touch input device, etc. The output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600 and/or coupled with computing device 600. Computer storage media may be non-transitory and tangible and does not include a carrier wave or other propagated data signal.

Communication media may be embodied by computer readable instructions, data structures, program modules, or other data in a modulated data signal, such as a carrier wave or other transport mechanism, and includes any information delivery media. The term “modulated data signal” may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase “at least one of element A, element B, or element C” is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed:

1. A method, comprising:

detecting, by an image server system, that a zone domain name system (DNS) server associated with a zone is unavailable;

in response to detecting that the zone DNS server is unavailable:

retrieving, from a repository, an image file comprising a set of DNS records associated with the zone DNS server, storing the image file on an image DNS server of the image server system, and transmitting, to a higher-level DNS server, an indication that the image DNS server is a DNS server for the zone;

receiving, at the image server system from a DNS resolver, an indication of a requested domain name in the zone; and in response to receiving the indication of the requested domain name:

identifying, in the image file stored on the image DNS server, an IP address based on the requested domain name, and transmitting, to the DNS resolver, the IP address.

2. The method of claim 1, wherein the set of DNS records map domain names of the zone to corresponding IP addresses.

3. The method of claim 1, wherein one or more DNS records of the set of DNS records has been cryptographically signed for subsequent authentication.

4. The method of claim 1, wherein the image file comprises a signed zone-signing key (ZSK) associated with the image DNS server, wherein the signed ZSK is cryptographically signed by a key-signing key (KSK) associated with the zone DNS server, the method further comprising:

determining, by the image server system, that a first DNS record of the set of DNS records needs to be cryptographically signed; and in response to the determination that the first DNS record needs to be signed, cryptographically signing the first DNS record with the signed ZSK.

5. The method of claim 4, wherein determining that the first DNS record needs to be cryptographically signed includes receiving, from a DNS resolver, a request for the first DNS record, the method further comprising:

transmitting the cryptographically signed first DNS record to the DNS resolver.

6. The method of claim 4, wherein determining that the first DNS record needs to be cryptographically signed includes determining that an IP address associated with the first DNS record has changed from a first IP address to a second IP address; and in response to the determination that the IP address has changed:

updating the IP address of the first DNS record from the first IP address to the second IP address to generate an updated first DNS record.

7. The method of claim 1, wherein the image file comprises an indication of allowable transfers from other zones.

8. The method of claim 1, further comprising:

transmitting, to the higher-level DNS server, expiration information associated with the indication that the image DNS server is the DNS server for the zone.

9. The method of claim 1, wherein detecting that the zone DNS server is unavailable comprises:

determining, by the image server system, that a response time of the zone DNS server exceeds a threshold latency.

10. The method of claim 1, wherein detecting that the zone DNS server is unavailable comprises:

receiving a notification from an external computing device.

11. The method of claim 1, wherein the set of DNS records includes a start of authority (SOA) record.

12. The method of claim 1, wherein the higher-level DNS server is a top-level domain (TLD) DNS server or a root DNS server.

13. A system, comprising:

at least one processor; and memory, storing instructions that, when executed by the at least one processor, cause the system to perform a method, the method comprising:

detecting that a zone domain name system (DNS) server associated with a zone is unavailable;

in response to detecting that the zone DNS server is unavailable:

retrieving, from a repository, an image file comprising a set of DNS records associated with the zone DNS server, storing the image file on an image DNS server of the system, and transmitting, to a higher-level DNS server, an indication that the image DNS server is a DNS server for the zone;

receiving, from a DNS resolver, an indication of a requested domain name in the zone; and in response to receiving the indication of the requested domain name:

identifying, in the image file on the image DNS server, an IP address based on the requested domain name, and transmitting, to the DNS resolver, the IP address.

14. The system of claim 13, wherein the set of DNS records map domain names of the zone to corresponding IP addresses.

15. The system of claim 13, wherein one or more DNS records of the set of DNS records has been cryptographically signed for authenticating the respective DNS record.

16. The system of claim 13, wherein the image file comprises a signed zone-signing key (ZSK) associated with the image DNS server, wherein the signed ZSK is cryptographically signed by a key-signing key (KSK) associated with the zone DNS server, the method further comprising:

determining that a first DNS record of the set of DNS records needs to be cryptographically signed; and in response to the determination that the first DNS record needs to be cryptographically signed, cryptographically signing the first DNS record with the signed ZSK.

17. The system of claim 16, wherein determining that the first DNS record needs to be cryptographically signed includes receiving, from a DNS resolver, a request for the first DNS record, the method further comprising:

transmitting the cryptographically signed first DNS record to the DNS resolver.

18. A method performed at an image server system, the method comprising:

detecting that a zone domain name system (DNS) server associated with a zone is unavailable; and in response to detecting that the zone DNS server is unavailable:

retrieving, from a repository, an image file comprising a set of DNS records associated with the zone DNS server, retrieving a signed zone-signing key (ZSK) associated with an image DNS server of the image server system, wherein the signed ZSK is cryptographically signed by a key-signing key (KSK) associated with the zone DNS server, storing the image file and the signed ZSK on the image DNS server, and transmitting, to a higher-level DNS server, an indication that the image DNS server is a DNS server for the zone;

after storing the image file and the signed ZSK on the image DNS server, determining that a first DNS record of the set of DNS records needs to be cryptographically signed;

in response to the determination that the first DNS record needs to be cryptographically signed, cryptographically signing the first DNS record with the signed ZSK; and transmitting the cryptographically signed first DNS record to a DNS resolver.

* * * * *